United States Patent [19]

Sisler

[11] Patent Number: 5,140,720
[45] Date of Patent: Aug. 25, 1992

[54] RECIPROCAL ATTITUDE-ANGLE SELF-DIFFERENTIATING DEVICE FOR PIVOTABLE WHEELS OF HANDTRUCKS

[75] Inventor: Remo Sisler, Sommacampagna, Italy
[73] Assignee: New Technologies Srl, Verona, Italy
[21] Appl. No.: 448,961
[22] Filed: Dec. 12, 1989

[30] Foreign Application Priority Data

Dec. 28, 1988 [IT] Italy .................. 84976 A/88

[51] Int. Cl.⁵ ............................................. B60B 33/00
[52] U.S. Cl. ............................................. 16/35; 280/98
[58] Field of Search ............. 16/35 D, 48; 280/98, 280/86

[56] References Cited

U.S. PATENT DOCUMENTS

| | | | |
|---|---|---|---|
| 1,956,798 | 5/1934 | Janssen . | |
| 2,557,275 | 6/1951 | Geisse | 16/35 D |
| 2,719,724 | 10/1955 | Lundgren | 16/48 |
| 3,689,101 | 9/1972 | Spence | 16/44 |

FOREIGN PATENT DOCUMENTS

| | | |
|---|---|---|
| 3514638 | 10/1986 | Fed. Rep. of Germany . |
| 338207 | 3/1904 | France . |
| 2319521 | 2/1977 | France . |

Primary Examiner—Robert L. Spruill
Assistant Examiner—Carmine Cuda
Attorney, Agent, or Firm—Wegner, Cantor, Mueller & Player

[57] ABSTRACT

Reciprocal attitude angle self-differentiating device (10) for pivotable wheels (11,12;110) of handtrucks, each of the wheels (11,12;110) being respectively rotatably mounted about a substantially horizontal axis (22,23;220) belonging to a wheel supporting body (21,15;210), the body (21,15;210) being rotatably mounted about a substantially vertical axis (29,30;290), in which at least one pair of wheels belonging to the handtruck being mutually coupled by means of a device (10) comprising:

a) a first coupling mechanism (14), cooperating with the supporting body (15) of the first (12) of the wheels belonging to the pair;

b) a second coupling mechanism (13,25;130,250) freely movable mounted on the supporting body (21;210) of the second wheel (11;10) belonging to the pair of wheels, the second mechanism (13,25;130,250) cooperating with a third mechanism (16,24;240) integral and rigidly connected with the supporting body (21;210) of the second wheel (11;110);

c) a fourth, motion transmitting, mechanism (20), cooperating with the first (14) and the second (13,25;130,250) coupling mechanisms; and d) fifth mechanism (26,27;34,35,260) being interposed between the said (13,25;130,250) coupling mechanism and the third mechanism (16,24;240) integral and rigidly connected with the supporting body (21;210) of the second wheel (11,110).

19 Claims, 3 Drawing Sheets

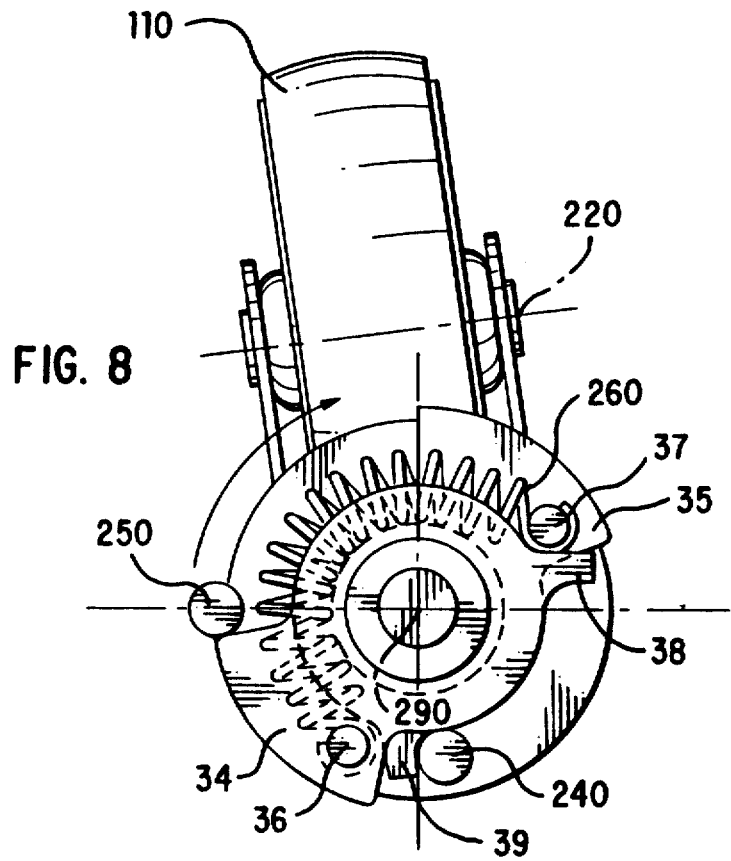
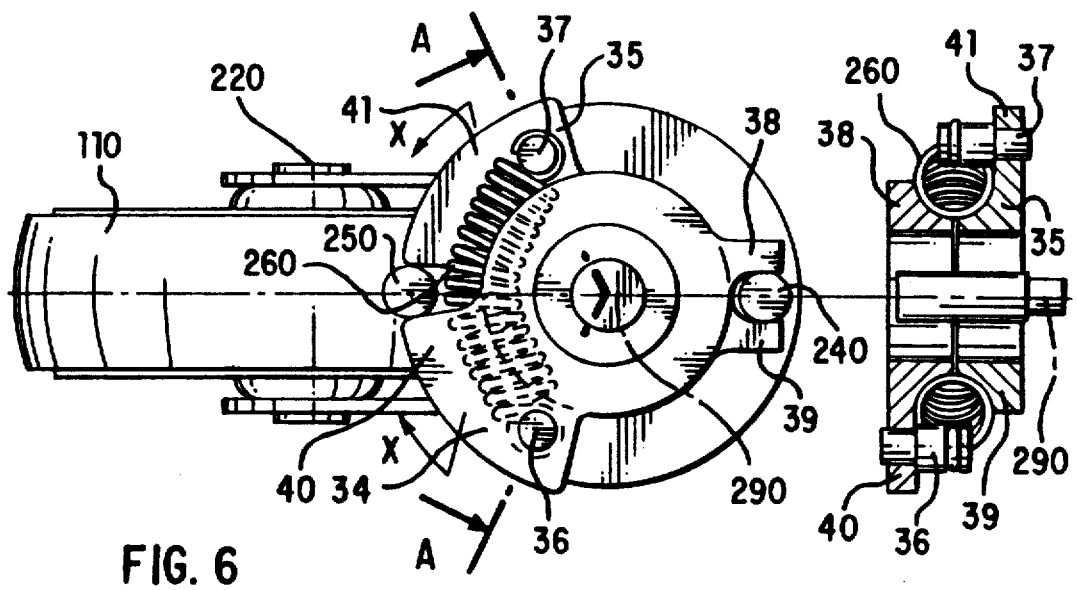

RECIPROCAL ATTITUDE-ANGLE SELF-DIFFERENTIATING DEVICE FOR PIVOTABLE WHEELS OF HANDTRUCKS

The present invention relates to a reciprocal attitude angle self-differentiating device for pivotable wheels of handtrucks.

More particularly, the present invention relates to a device for automatically correcting the attitude angle of the pivotable wheels of handtrucks suitable for carrying materials, such as industrial, supermarket or warehouse handtrucks, or handtrucks for public utility services or hospital beds and furniture, or ladders and scaffolds provided with pivotable wheels.

Said invention is mainly applied in the field of the mechanical industry and of the transport on wheels.

Handtrucks are known, which are provided with a plurality of wheels which are independently pivotable in any direction.

The main feature of said pivotable wheels, which are able of pivoting about a vertical axis, is that of continuously taking the right attitude angle, depending on the handtruck movement.

However, the fact of assuming that such independently pivotable wheels would continuously restore a reciprocally right and correct attitude angle, should be considered as merely theoretical.

In fact, the restoration of the right attitude angle is disturbed, in normal duty conditions of said handtrucks, by route obstacles which exert a negative influence on the attitude angle of the single wheels.

Such obstacles may be represented, for instance, by sudden direction changes of the operator during his run, or by one of the wheels meeting a small obstacle during the route as well as, in the case of handtrucks having four wheels, by one of the wheels loosing contact and adhesion from the ground.

Moreover, problems may arise owing to the fact that the load is practically never arranged on the handtruck in a balanced way, or because the wheels are scarcerly or unequally lubricated, and because of the considerable distance interposed between the wheels and the driving handle.

Specifically referring to supermarket or to industrial handtrucks, it should be noted that the control bar or handle, on which is exerted the propulsive force for moving the handtruck also along a curved path, is located in such a way as to mainly act on the rear wheels of the handtruck, since these are closer to said control bar than the front wheels.

Consequently, while the effort necessary for orienting the rear wheels of the handtruck is rather small, said effort should be multiplied for achieving the orientation of the front wheels.

Furthermore, in the case where a load would be placed on the basket or on the flat loading surface of the handtruck, the effort necessary for curving the front wheels becomes even much higher.

These factors should be added to the cited lubrication difficulties, to the obstacles, and so on.

These drawbacks normally result in a sudden change of direction of one or more wheels which assume, at the same time, different, arbitrary and generally reciprocally and mutually hindering attitude angles, thus causing the arrest of the handtruck motion or its stability to be heavily compromised; thus, these drawbacks result in a remarkable loss of time and work.

Document DE-A-3,514,638 discloses a four-wheels handtruck suitable for carrying a motion-picture camera, a so-called camera dolly.

Said handtruck comprises a series of chains connected to a control shaft by means of which all of the four wheels may be rotated at the same time.

The handtruck is not provided with means for differentiating the attitude angle of the wheels in relation to the bending angle of the same handtruck.

Document FR-A-2,319,521 discloses another handtruck provided with four wheels and suitable for carrying a telecamera.

Said handtruck comprises a frame on which are rotatably mounted four arms, the ends of which being provided with pivotable wheels.

Each of the wheels is connected to the rotation pivot of the corresponding arm on the frame by means of a belt or a chain drive.

Furthermore, the rotation pivots of the various arms are connected, two by two, by drive belts or chains which are parallel to the longitudinal axis of the frame.

Further, a rotatable control shaft is provided which is connected to two of the rotation pivots of the arms by means of a belt or chain drive and a series of compensation pinions.

This system, which is extremely complicated, is provided with a plurality of belts or chains (in the illustrated example each handtruck comprises seven belts and several pinions), and is therefore rather expensive.

Furthermore, the handtruck itself is not suitable for being used inside of factories or supermarkets, since the arms supporting the wheels carry out lateral movements which substantially modify the handtruck overall dimensions.

Document FR-A-338,207 discloses an elastic driving system which may be applied to motor vehicles in order to take up the motor thrusts and to achieve a more regular gradualness.

Said system comprises a shock absorbing device having a pair of opposed springs connecting two drive shafts.

Said device is not described as being suitable for compensating the reciprocal attitude angle of the wheels of a handtruck.

Document U.S. Pat. No. 1,956,798 discloses a torsional shock absorbing device for conveying power from the motor in smooth flow to the drive wheels.

Also this device is not suitable for being used in combination with a handtruck in order to modify the reciprocal attitude angle of the pivotable wheels.

It is an object of the present invention to obviate to the drawbacks which are typical of the known handtrucks and to provide, therefore, a device which, while being completely indifferent to any kind of obstacles, thus allowing all the handtruck wheels to continuously assume the right attitude angle, has a simple structure, which is economical, highly reliable and easy to be upkept.

This is obtained by a reciprocal attitude angle self-differentiating device for pivotable wheels of handtrucks having the features disclosed in claim 1.

The dependent claims describe advantageous forms of embodiment of the invention.

The present invention provides for the insertion, in the normal driving system of the four wheels generally present in the handtrucks, of one or more devices connecting, two by two, pairs of said wheels in such a way as they simultaneously pivot about their respective axes.

By way of example, this is obtained by coupling pairs of said wheels by means of a positive drive system comprising a pair of pulleys which cooperate with the respective pivoting systems of the two wheels and a toothed belt interconnecting said pulleys.

Such a positive drive system unifies the movement for assuming a certain attitude angle of the two interconnected wheels.

However, the two pivotable wheels connected in the described way require, each, a different attitude angle from the other, since the handtruck, which is manually driven, continuously undergoes direction changes during its route.

According to an essential feature of the invention, at least one of the wheels of said pair carries a reciprocal attitude angle self-differentiating device, by means of which the right attitude angle of both wheels is automatically restored following to any direction change of the handtruck.

More particularly, taking as an example the case where the handtruck would be provided with four wheels, coupled in two pairs, the self-differentiating device cooperates with a pulley which idly mounted on the pivoting axis of one wheel; the device takes over the rotating movement of the pulley and transfers said movement, after having adequately corrected it, to the same wheel.

In the meantime, the self-differentiating device provides for a self-restoring action, that is, for an automatical setting for a new attitude angle correction following to another change of direction of the handtruck.

The self-differentiating device allows thus the pivotable wheels to reciprocally adjust themselves to any kind of route; each wheel assumes the ideal attitude angle in relation to the thrust exerted by the operator.

Said self-differentiating device is generally provided with resilient means, such as helical springs, which practically carry out the self-restoring action, that is the immediate and automatical setting action for correcting the wheels attitude angle in another, opposite, direction.

According to an advantageous form of embodiment of the invention, both of the pivotable wheels belonging to a pair of connected wheels are provided with a reciprocal attitude angle self-differentiating device.

In this case, any variation from the best route of anyone of the wheels is automatically and immediately corrected and compensated thanks to the combined and simultaneous action of the self-differentiating devices which are placed on both wheels.

According to another preferential form of embodiment of the invention, which is applied to handtrucks having four wheels, one of the wheels, advantageously the wheel which is free from the self-differentiating device, cooperates with a springing device acting in an generally vertical direction.

Said springing device allows the adaptation of the handtruck to imperfections which may be present on the surface on which the handtruck is pushed.

The above description gives rise to the consideration that, in the case of supermarket handtrucks, which are intended to carry not very heavy loads, something about some dozens of kilograms, the ideal disposition comprises only the front pair of pivotable wheels being connected by means of one or two attitude angle self-differentiating devices, which allow the effort necessary for turning the front side of the handtruck to be highly reduced, in particular when said handtruck is loaded.

On the contrary the rear wheels, on which the thrust is exerted in a more direct way by means of the control handle, may be left as independently pivotable from each other.

This solution allows several handtrucks to be easily driven into each other from the rear side for parking them just as the conventional supermarket handtrucks, since the connection by means of a belt or of a chain (or other) takes place between the front wheels, which are placed at a shorter reciprocal distance than the rear wheels.

It is anyway possible to pair by means of one or two self-differentiating devices also the rear wheels of this kind of handtrucks, while preserving the possibility of driving the handtrucks into each other.

In this case each wheel is provided with a longer rotation shaft; thus, the location of the pulleys and of the belt forming the coupling between the wheels is raised.

Referring to the handtrucks for industrial use, it would be advisable, cause of the higher loads (which may exceed some hundreds of kilograms) which they are intended to carry, to connect by means of reciprocal attitude angle self-differentiating devices both of the front and rear pairs of wheels of said handtrucks.

The use of the invention in connection with this kind of handtrucks is particularly advisable, since it allows an operator to exert a thrust on the handtruck starting from any point of its periphery or even from the load; this allows a great agility in the vicinity of irremovable obstacles.

These and further features and advantages of the device according to the present invention will become more apparent from the detailed description given hereinafter with reference to the figures which show a preferred embodiment of the invention by way of a non-limiting example.

FIG. 6 shows a plan view of the wheel of FIG. 5, in a resting position of the self-differentiating device;

FIG. 7 shows a A—A section of FIG. 6, illustrating a pair of elements belonging to the self-differentiating device according to said second form of embodiment;

FIG. 8 shows an analogous view to that of FIG. 6, in which the wheel is in a position of unstable equilibrium and the self-differentiating device in a working position.

Figure 1:
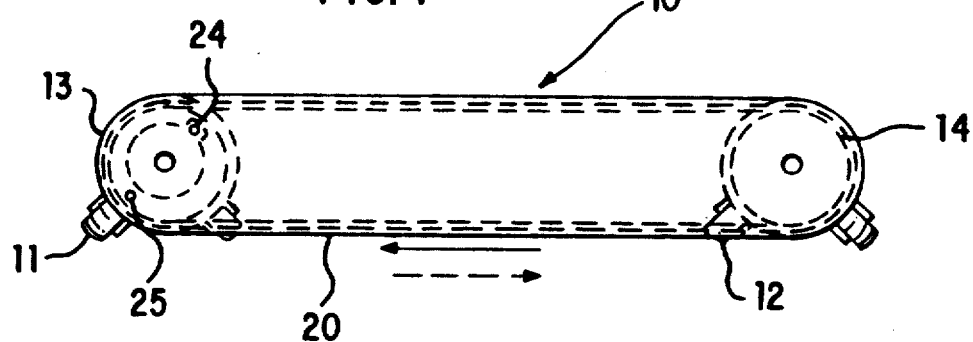
FIG. 1 is a sectional plan view showing the connection between two wheels of a handtruck.

In the drawings, reference sign 10 indicates a coupling between two pivotable wheels 11, 12 of a handtruck according to the present invention.

Said wheels 11, 12 have, each, a horizontal rotation axis 22, 23, as provided for in their respective wheel supporting body 15, 21.

Moreover, each of said wheel supporting bodies 15, 21 is rotatably mounted about a substantially vertical axis 29, 30.

Figures 2, 3:
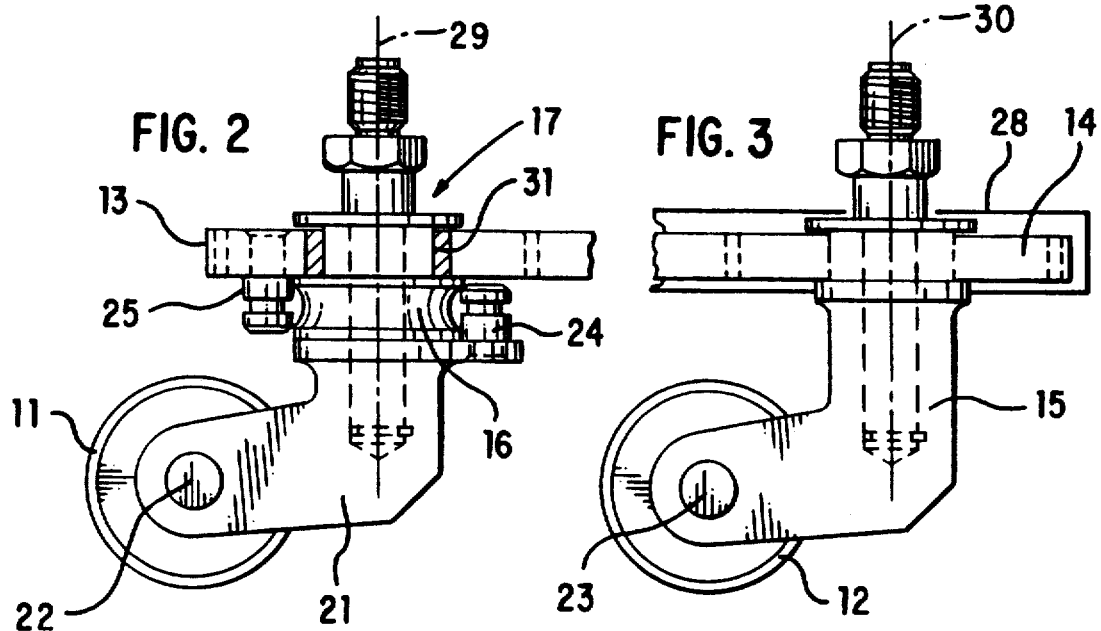
FIG. 2 shows a side view of a pivotable wheel provided with an attitude angle self-differentiating device according to a first form of embodiment of the invention.
FIG. 3 shows a side view of a pivotable wheel suitable for being coupled with the wheel shown in FIG. 2.

According to this first form of embodiment the coupling comprises two pulleys 13, 14, one of which (14) is directly keyed on the supporting body 15 of wheel 12 (see FIG. 3), while the other pulley (13) cooperates with a reciprocal attitude angle self-differentiating device 17, said other pulley 13 being idly mounted on an element 16 constituting the body of said device 17 by means of a bushing 31.

Figure 4:
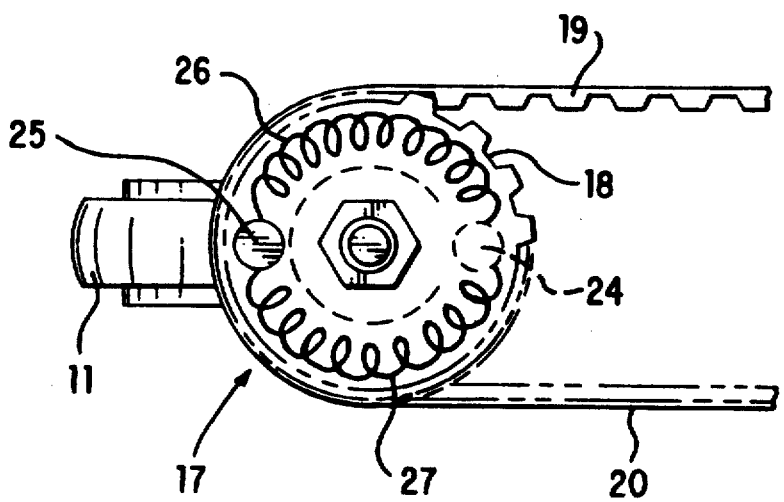
FIG. 4 shows a sectional plan view of an attitude angle self-differentiating device according to FIG. 2, as mounted on a pivotable wheel.

In the form of embodiment shown in the figures, the pulleys 13, 14 are of the "positive drive" type, thus they are provided with axial grooves 18 cooperating with the teeth 19 of a belt 20 (see FIG. 4), the assembly pulleys-belt being covered by a suitable protecting structure 28.

This kind of drive, which is free from any clearance, realizes a practically perfect coupling of the wheels 11, 12, thus allowing said wheels to undergo a large, combined and simultaneous pivoting movement.

Therefore, this kind of coupling appears to be extremely convenient for supermarket handtrucks.

The attitude angle self-differentiating device 17 according to this first form of embodiment comprises a body 16 integral with the supporting body 21 of the wheel 11.

A first pawl 24 is mounted on the body 16, whereas a second pawl 25 is mounted on the pulley 13.

Resilient means, in this case represented by two counter springs 26, 27 of the draw type, which are opposed to each other relative to a vertical axis, are hooked by their respective ends to said first (24) and second (25) pawls; in operation, said springs 26, 27 cause said pawls 24, 25, to keep a diametrically opposed position in respect to each other.

Said springs 26, 27, when suitably geared to the load which may be carried by the handtruck, realize the differentiating coupling between the wheels 11, 12.

Since, obviously, running along a curved path, the attitude angle of the wheels is never the same for both wheels, the self-differentiating device 17 carries out an instantaneous returning of the wheel 11 to its ideal and right attitude angle, depending on the handtruck movements caused by the operator.

It appears to be clear that, in a four-wheel handtruck, two couplings 10 of the type mentioned above make up a wheel train which allows an operator to immediately and instinctively push or pull the handtruck in any direction; furthermore, any problem arising from a sudden and arbitrary orientation of one or more wheels is completely and definitely avoided.

According to a preferred form of embodiment of the invention, one of the wheels of a four-wheel handtruck of the type mentioned above is provided with a suspension system acting in a vertical direction; on economy grounds, said suspension system is generally mounted on the wheel which is free from the self-differentiating device.

This form of embodiment, which is not shown in the figures, allows an automatic adaptation of the handtruck to the surface on which the wheels are running, compensating in this way any imperfections which could be present on said surface.

FIGS. 5 to 8 show a second form of embodiment of the device according to the present invention.

Similar elements to those described with reference to FIGS. 1 to 4 are indicated with the same reference signs, provided with the appendix "0" (zero).

Figure 5:
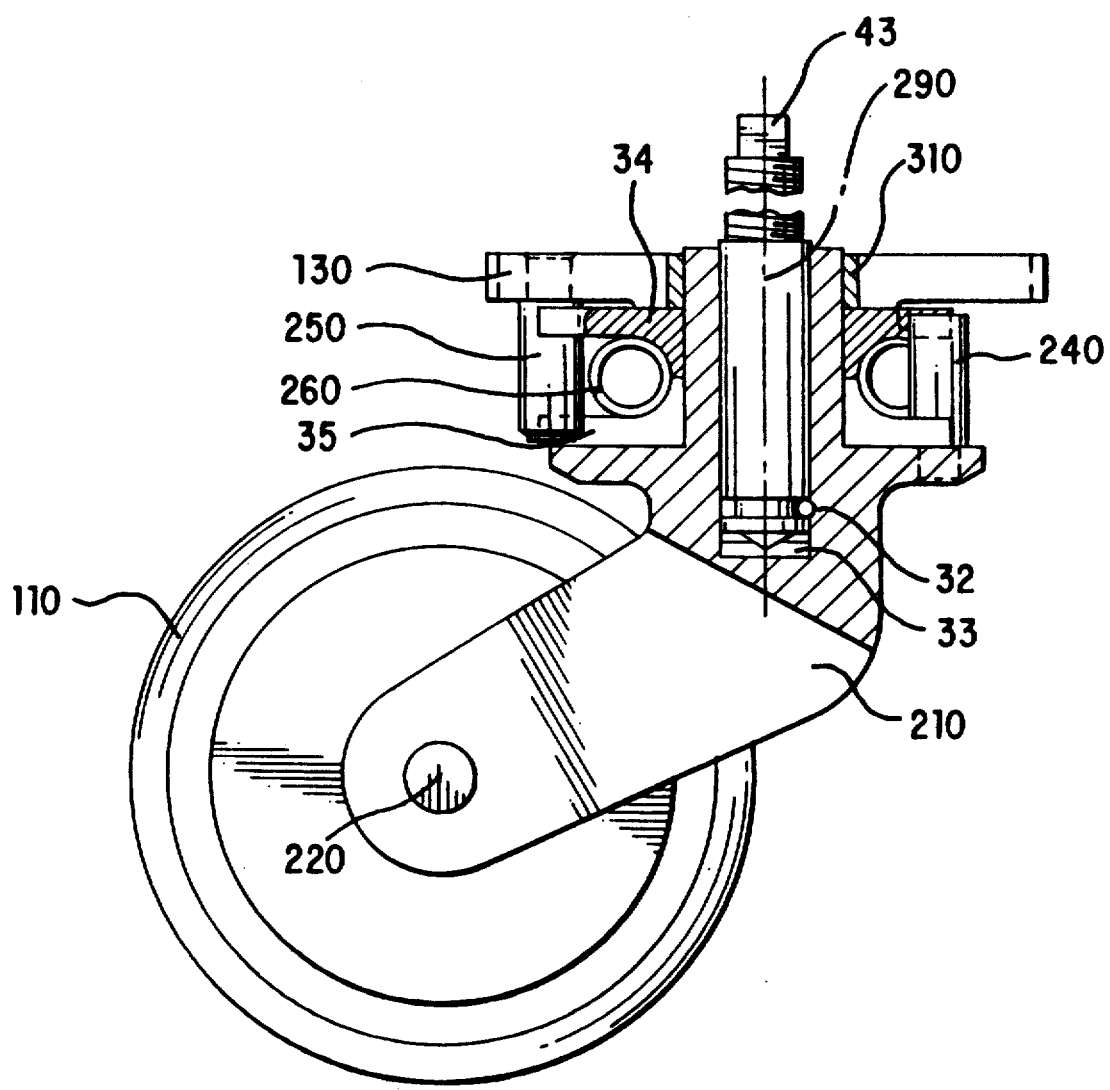
FIG. 5 shows a partial cross section of a pivotable wheel provided with an attitude angle self-differentiating device according to a second form of embodiment.

In FIG. 5, reference sign 110 indicates a pivotable wheel rotatable about a horizontal rotation axis 220 carried by a wheel supporting body 210.

Furthermore, said wheel supporting body 210 is rotatably mounted about a substantially vertical axis 290.

In this case, said axis is represented by a shaft 43, one end of which is threaded and fastened to the handtruck frame by means of a nut.

In the case illustrated in FIG. 5 the coupling comprises a pulley 130, which is idly mounted on the axis 290 by means of a bushing 310.

The connection between axis 290 and supporting body 210 takes place by inserting said axis 290 in a dead hole arranged in the body 210, the end of said dead hole being provided with a pastille 33 forming a contact surface for the tip of the shaft 43; said shaft 43 and the body 210 are coupled by means of a pin 32 which is inserted in a generally horizontal hole arranged in the body 210 in the vicinity of a groove located close to the tip of the shaft 43.

Said pin 32 prevents any vertical movement of the body 210 along the axis 290, while allowing a free rotation of said body 210 about said axis.

In the case where both of the connected wheels are provided with a self-differentiating device, the pulley 130 cooperates by means of a belt with a similar pulley, which is also idly mounted on the axis of another handtruck wheel; obviously, other kinds of couplings, such as by means of two pinions and a chain, may be adopted.

The supporting body 210 of the wheel 110 also supports an attitude angle self-differentiating device.

The self-differentiating device comprises a first pawl 240, integral with the wheel supporting body 210, and a second pawl 250, integral with the pulley 130.

Said first (240) and second (250) pawls cooperate with a pair of rotation elements or sectors 34, 35, which are identical and superimposed one on the other.

Each of the sectors 34, 35 (see also FIGS. 6 to 8) is arranged on the body 210 and is freely rotatable about the axis 290.

As shown in detail in FIGS. 6 to 8, each element 34, 35 comprises, respectively, a first extension 38, 39 and a second extension 40, 41, both of said extensions being suitable for cooperating with said first (240) and second (250) pawls, in a way which will be described in detail.

Close to one end of said second extension 40, 41 of both elements 34, 35 is placed a pin 36, respectively 37.

Said pins cooperate, when mounted, with resilient means, in the present case with a helicoidal spring 260 whose ends are hooked to said pins 36, 37, said spring 260 being housed in a slot formed between the two superimposed elements 34, 35.

The operation of the self-differentiating device according said second form of embodiment is the following.

Referring to FIG. 6, we may note that the handtruck wheel 110 is in a so-called resting position, in which both of the coupled wheels are parallel to each other and aligned to the the longitudinal advancing axis of the handtruck which, in the case where it would be pushed in a direction parallel to that of said axis, would advance straightaway.

This applies in the case where each of the two wheels would be provided with a self-differentiating device, and in the case where only one wheel would be provided with such a device, the other wheel being connected to the former by a belt-pulley coupling, for instance.

On examining FIG. 6, it appears to be clear that, in such resting position, one edge of said first extensions 38, 39 of both elements 34, 35 contacts said first pawl 240, while one edge of said second extensions 40, 41 of the elements 34, 35 contacts said second pawl 250.

This resting position, in which the vertical axes of both pawls 240, 250 and the axis 290 lay on the same vertical plane passing on the centre of wheel 110, is achieved thanks to the traction effort, in the direction indicated by the arrows X—X, exerted by the spring 260 on the pins 36, 37 connected to the elements 34, 35.

FIG. 8 shows a theoretical and unstable working position, suitable for explaining the movement of the spring 260.

In this position the wheel 110 has just undergone a sudden clockwise deviation and the pulley 130 (see FIG. 5) and the pawl 250, integral with it, are momentarily held in the resting position.

Following to that deviation the pawl 240, which is integral with the wheel supporting body, also undergoes a corresponding clockwise deviation, and it causes the rotation of element 35 about axis 290 by means of said first extension 39.

As previously illustrated, the element 35 is provided with a pin 37, hooked to which is one end of spring 260; consequently, spring 260 undergoes a sudden clockwise traction.

However, as previously pointed out, this situation is absolutely unstable, since the resiliency of the spring 260 causes in this very moment the clockwise rotation of pin 36, hooked to which is the other end of the spring 260.

Said pin 36 is integral with the element 34 which now exerts a clockwise thrust on pawl 250 which is integral with the pulley 130 (see FIG. 5).

On its turn, the pulley 130 turns clockwise and, by means of the coupling belt, acts on the pulley of the other wheel; said pulley transfers then the rotary movement to said other wheel.

In the case where both of the coupled wheels would be provided with a reciprocal attitude angle self-differentiating device (and this corresponds to the most preferable form of embodiment), any change of direction of each of the two wheels is automatically transferred to the other wheel; at the same time, the force exerted by the spring comprised in one self-differentiating device reciprocally interacts with the force exerted by the spring comprised in the other self-differentiating device.

This mutual exchange of forces results in the disposition assumed by both wheels, which are continuously positioned in such a way as their respective rotation axes 220 are directed towards the instantaneous rotation centre, which is determined by the direction change of the handtruck; it is important to remark that such position represents the ideal theoretical position which would be assumed by the wheels in the case where they were perfectly built, independently mounted (i.e. without coupling) on the handtruck, and the floors were flat and smooth, without any unevenness.

The self-differentiating effect of the coupled wheels shows up clearly in the case where unevennesses were present on the floor.

In fact, in the case where one wheel is deviated from its ideal path cause of any kind of obstacles, the other wheel, which actually follows its ideal path, calls back the first wheel to the correct position by means of the self-differentiating device, which exerts the higher resilient effort the wider is the first wheel's deviation from its ideal path.

It appears now to be clear that the reciprocal differentiation of the wheels' attitude angle allows an operator to exert the lowest necessary effort for deviating a handtruck from a rectilinear path, thus achieving the scope of the invention.

In this context it should be noted that a mere connection of two wheels by means of a belt-pulleys combination is not sufficient for solving the problem underlying the present invention.

In fact, in the case where a pair of wheels provided with pulleys were solely coupled by means of a belt, and without a self-differentiating device, said wheels would continuously maintain a position parallel to each other; this considerably increases the friction against the floor and, consequently, the effort exerted by the operator on the occasion of a direction change of the handtruck.

In the case where only one of the wheels is provided with a self-differentiating device, the applicants experimentations have shown that, although the friction exerted by the wheels on the ground (thus the operator's effort) lowers in a considerable way, the sensitivity of the differentiating effect on the handtruck wheels is lower compared to the case where both of the wheels of a pair were provided with the device according to the present invention.

The present invention has been described with reference to preferred and particularly advantageous forms of embodiment, which provide for a four-wheel handtruck and a positive drive for transmitting the motion from one wheel to the other wheel belonging to a respective pair of wheels.

However, the invention is not limited to the forms of embodiment described above; on the contrary, it comprises many other forms of embodiment which fall within its scope.

Thus, a form of embodiment which falls within the scope of the invention provides for only one pair of wheels of a handtruck being connected by means of an attitude angel self-differentiating device.

Furthermore, there are forms of embodiment falling within the scope of the invention, in which the handtruck comprises any number of pairs of wheels.

Again, there are forms of embodiment which fall within the scope of the invention, in which the transmission of the movement between the wheels takes place by means other than a positive drive with pulleys and belts.

More particularly, there are forms of embodiment which fall within the scope of the invention, in which said movement transmission is realised by a shaft-pinion gear coupling, or by helical gears, or by pneumatical or rack couplings.

Finally, another form of embodiment which falls within the scope of the invention comprises the coupling between the wheels of every pair being realised by means of two crown gears connected by a chain.

The latter form of embodiment is particularly preferred and advantageous in the case of industrial handtrucks, which are suitable for carrying very heavy loads.

I claim:

1. A reciprocal attitude angle self-differentiating device for a hand-propelled vehicle having at least one pair of caster wheels, each of said wheels being mounted on a supporting body for rotation about an essentially horizontal axis, said supporting bodies each being rotatable about an essentially vertical axis, said device comprising:

a first pulley mounted on the supporting body corresponding to one wheel of said pair of wheels;

a second pulley mounted on the supporting body corresponding to the other wheel of said pair of wheels;

a belt disposed on said first and second pulleys; and resilient means operatively coupled to the supporting body corresponding to the other wheel of said pair of wheels for biasing the horizontal rotation axis of each caster wheel into mutual parallel alignment when the vehicle is moved along a rectilinear path in any direction while allowing instantaneous centering for curved path travel.

2. A device as in claim 1, wherein said first pulley is fixed on its corresponding supporting body.

3. A device as in claim 2, wherein said second pulley is an idler pulley rotatable on its corresponding supporting body.

4. A device as in claim 3, wherein said belt is a positive drive toothed belt.

5. A device as in claim 1, wherein said means includes a member integral and rigidly connected with the supporting body corresponding to the other wheel of said pair of wheels, and a first pawl disposed on said member.

6. A device as in claim 5, wherein said means further includes a second pawl disposed on said second pulley, and a pair of helical, diametrically opposed counter springs coupled to said first pawl and said second pawl, respectively.

7. A device as in claim 1, wherein said first pulley is a toothed pulley idly mounted on the supporting body corresponding to said one wheel, said first pulley being rotatably movable about the essentially vertical axis.

8. A device as in claim 7, wherein said means includes a first pawl disposed on said supporting body corresponding to said other wheel.

9. A device as in claim 8, wherein said means further includes:

a first and a second rotation element, said rotation elements being superimposed one on the other and idly mounted about said essentially vertical axis;

a second pawl integral with said first pulley; and a spring interposed between said first and second rotation elements, said first and second rotation elements acting upon said first pawl and said second pawl, respectively.

10. A device as in claim 9 wherein said first and second rotation elements are essentially identical and each are provided with a slot which accommodates said spring.

11. A device as in claim 10, wherein said first and second rotation elements each includes a pin which engages one end of said spring.

12. A device as in claim 11, wherein said first rotation element includes a first extension adapted to engage said first pawl and said second rotation element includes a second extension adapted to engage said second pawl.

13. A device as in claim 9, wherein, when said wheels are in a static equilibrium position which is determined while the wheels are raised off the ground, longitudinal axes of said first and second pawls are coplanar with said essentially vertical axis.

14. A device as in claim 6, wherein, when said wheels are in a static equilibrium position which is determined while the wheels are raised off the ground, longitudinal axes of said first and second pawls are coplanar with said essentially vertical axis.

15. A device as in claim 1, wherein the wheels include a suspension in a vertical direction.

16. A handtruck having at least four pivotable wheels, wherein at least two of the wheels are coupled by means of the device as in claim 1.

17. A furniture piece having at least two pivotable wheels, wherein said at least two pivotable wheels are coupled by means of the device as in claim 1.

18. A furniture piece as in claim 17, wherein said furniture piece is a bed.

19. A ladder or scaffold having at least two pivotable wheels, wherein said at least two pivotable wheels are coupled by means of the device as in claim 1.

* * * * *